Aug. 2, 1932.   N. TRBOJEVICH   1,869,528
DIFFERENTIAL GEARING
Filed Nov. 17, 1930   3 Sheets-Sheet 1

INVENTOR
Nikola Trbojevich

BY Whittemore Hulbert Whittemore
& Belknap
ATTORNEYS

Aug. 2, 1932.    N. TRBOJEVICH    1,869,528
DIFFERENTIAL GEARING
Filed Nov. 17, 1930    3 Sheets-Sheet 3

INVENTOR
Nikola Trbojevich.

BY Whittemore Hulbert Whittemore
+ Belknap
ATTORNEYS

Patented Aug. 2, 1932

1,869,528

UNITED STATES PATENT OFFICE

NIKOLA TRBOJEVICH, OF DETROIT, MICHIGAN

DIFFERENTIAL GEARING

Application filed November 17, 1930. Serial No. 496,292.

The invention relates to a novel differential such as might be used in automotive axles.

The invention resides in a wreath-like arrangement of the epicyclic pinions in which the said pinions are divided in two sets and are arranged in a continuous row in a circle in such a manner that any one pinion of the first set engages two adjacent pinions of the second set. By this means the tooth and bearing loads are substantially reduced as it will be hereinafter shown.

In a modification of this mechanism the two side gears, which are of the internal type, are generated according to a new variable velocity process of generation which I discovered.

The object of this invention is to provide a differential of the greatest possible strength, durability and compactness.

Another object is to provide a differential possessing certain self-locking characteristics obtained by the novel method of generating the tooth curves.

In the drawings

Figure 2 is the section 2—2 of Figure 1;

Figure 3 is the section 3—3 of Figure 1;

Figure 8 is a detail elevation of Figure 7 showing the mounting of the cutter and the gear to be cut;

Figure 1:
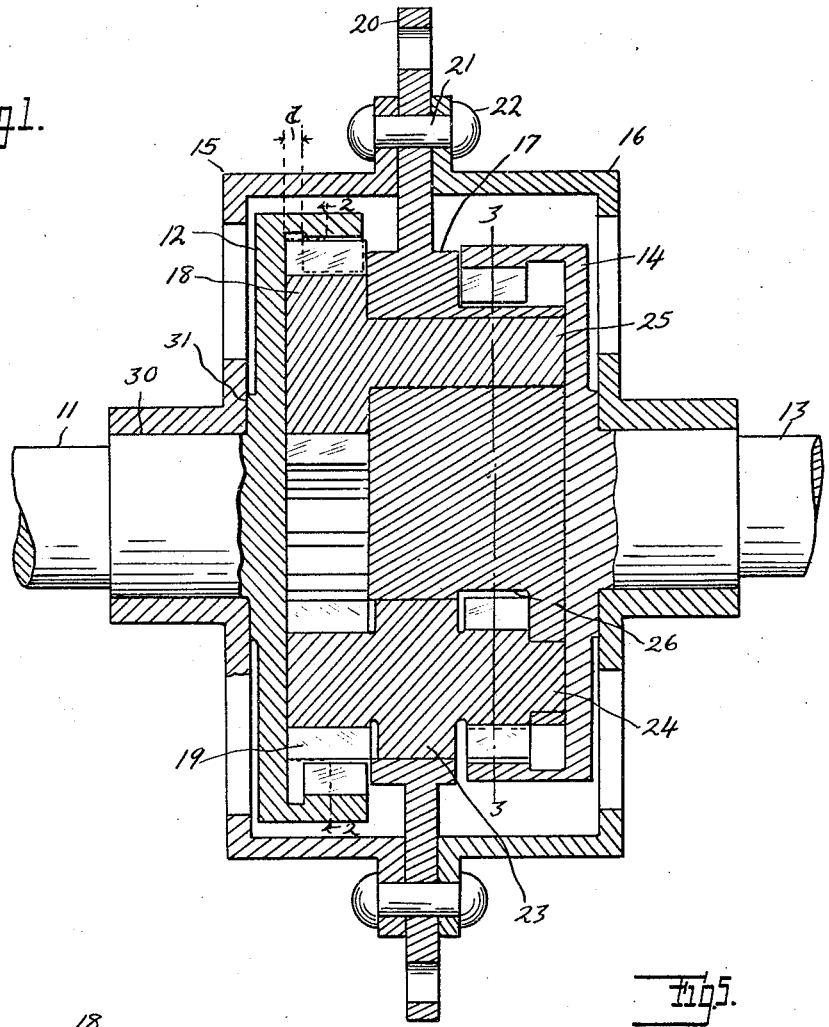
Figure 1 is the cross section of the new differential taken through its axis.

As is seen from Figures 1, 2 and 3, the axle 11 is integral with the internal gear 12 and the axle 13 with the internal gear 14, said axles being rotatably housed in the flanges 15 and 16 respectively. The spider 17 is provided with six equispaced bores in which two alternate sets consisting of three pinions each are rotatable. The three larger pinions 18 engage the left internal gear 12 at three points 120° apart, while the three smaller pinions 19 similarly engage the right internal gear 14. In addition, any one pinion of a set engages two adjacent pinions of the other set, said engagement taking place in the inside of the left side gear 12, thereby reducing the overall width of the mechanism.

In order to obtain these multiple contacts it is necessary to select the numbers of teeth of the gear elements according to a certain geometrical rule. Thus, in the shown combination the gears 12, 18, 19 and 14 have, in the order named, 24, 9, 6 and 21 teeth respectively. Another combination which is also correct, would be 33, 12, 9 and 30 teeth respectively taken in the same order.

The spider 17 is a disk-shaped forging and is provided at its outer circumference with a series of holes 20 in which the driving gear (not shown) may be bolted, and another series of holes 21 in which the two flanges 15 and 16 are riveted by means of the rivets 22. The six tooth pinion 19 is provided with teeth at its two ends and is left uncut at its middle portion 23, thus providing an uninterrupted bearing in the corresponding spider bore. A shank 24 of a smaller diameter situated at the right end of the said pinion provides an additional bearing. The nine tooth pinion 18 is provided with a comparatively long shank 25, said shank 25 being preferably of the same diameter as the shank 24. The spider 17 is provided with three equispaced semicircular slots 26 to clear the acting portion of the pinion 19 at the right hand side thereof.

In proportioning the tooth parts in this mechanism it is necessary to select the addendum of the six tooth pinion 19 small enough to clear the teeth of the ring gear 12 having 24 teeth at its inside diameter without touching the same. The maximum addendum that may be used is 75 percent of the standard as is readily shown. The triangle ABO, Figure 2 is equilateral, the side AB being (for 1 diametral pitch):

$$AB = \frac{9+6}{2} = 7.5$$

The distance $OC = 7.5 + \frac{6}{2} = 10.5$.

The distance $OD = \frac{24}{2} = 12$.

Hence $10.5 + s = 12 - s$ from which $$s = \frac{12 - 10.5}{2} = .750$$

showing that the gear teeth are what is called 75 per cent "stub".

It is also necessary so to form the tooth curves of the meshing pinions 18 and 19 that the meshing will be continuous, i. e. the "overlap" should be greater than one normal or base pitch. As I calculated, in involute system the maximum overlap of 1.40 is obtained for .75 addendum when the pressure angle of both pinions six and nine teeth respectively is selected to be 25° 13'. This calculation is not given here because it is somewhat complicated, but it may be said that the continuity of contact is readily preserved in this mechanism.

The action of the mechanism will be readily understood from Figure 2. Let the ring gear 12 turn in the direction of the arrow 27, then the nine tooth pinions 18 will turn in the direction of the arrow 28 and the six tooth pinions 19 will turn along the oppositely directed arrow 29 thus driving the ring gear 14 in a direction opposite to that of the ring gear 12. That is all that is necessary to obtain a differentiating or balancing action.

The distribution of the tooth loads and bearing thrusts is very favorable in this mechanism, indeed, the reduction of the said stresses is the primary object of this invention.

It is readily seen that there is no side thrust in any one of the eight gears employed in this mechanism because they are all of the spur type. The radial or bearing thrusts are also totally absent in the two ring gears 12 and 14 because due to the symmetrical arrangement of the driving pinions the separating forces, caused by the pressure angle of gear teeth, and the thrusts, caused by the tangential forces, are all automatically canceled out thus relieving the bearings 30 and 31 Figure 1 from all loads except those due to the inaccuracy of the mounting.

It will be of interest to note the method by which I approximately equalize the surface stresses in gear teeth. As is well known from the Hertz and Lewis formulas, an internal tooth contact produces less stress than does an external tooth contact for the same tangential loading because a concave to convex nature of contact provides a more intimate tangency of the mating surfaces than a convex to convex arrangement. In this particular case, the contact at the point E, Figure 2, is capable of carrying about three times as much load as is the convex to convex contact situated at the point F, for the same width of tooth faces.

Therefore, to equalize the stresses I first provided twice as many contacts of the type F as contacts of the type E and second, I increased the width of the tooth faces of the pinions 18 and 19 by a distance $d$ seen at the left side of Figure 1, thus further reducing the stress in the type F.

Figure 4:
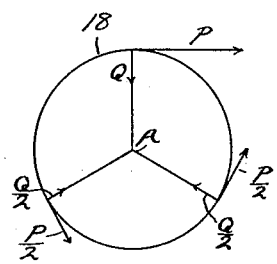
Figures 4, 5 and 6 are geometrical diagrams dealing with the bearing thrusts.

The wreath or chain-like arrangement of the epicyclic pinions in addition to reducing the maximum tooth stresses, as shown above, also reduces the bearing thrusts in the corresponding pinion shafts. As is seen in Figures 4, 5 and 6, the tangential force P tending to rotate the pinion 18 about its axis A generates two reactions in the adjacent pinions 19 120° apart, each reaction being numerically equal to $$\frac{P}{2}.$$

In the same manner, the separating force Q caused by the pressure angle of gear teeth and coacting with the tangential force P creates two reactions of a magnitude $$\frac{Q}{2}.$$

Figure 5:
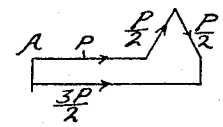
Figure 6:
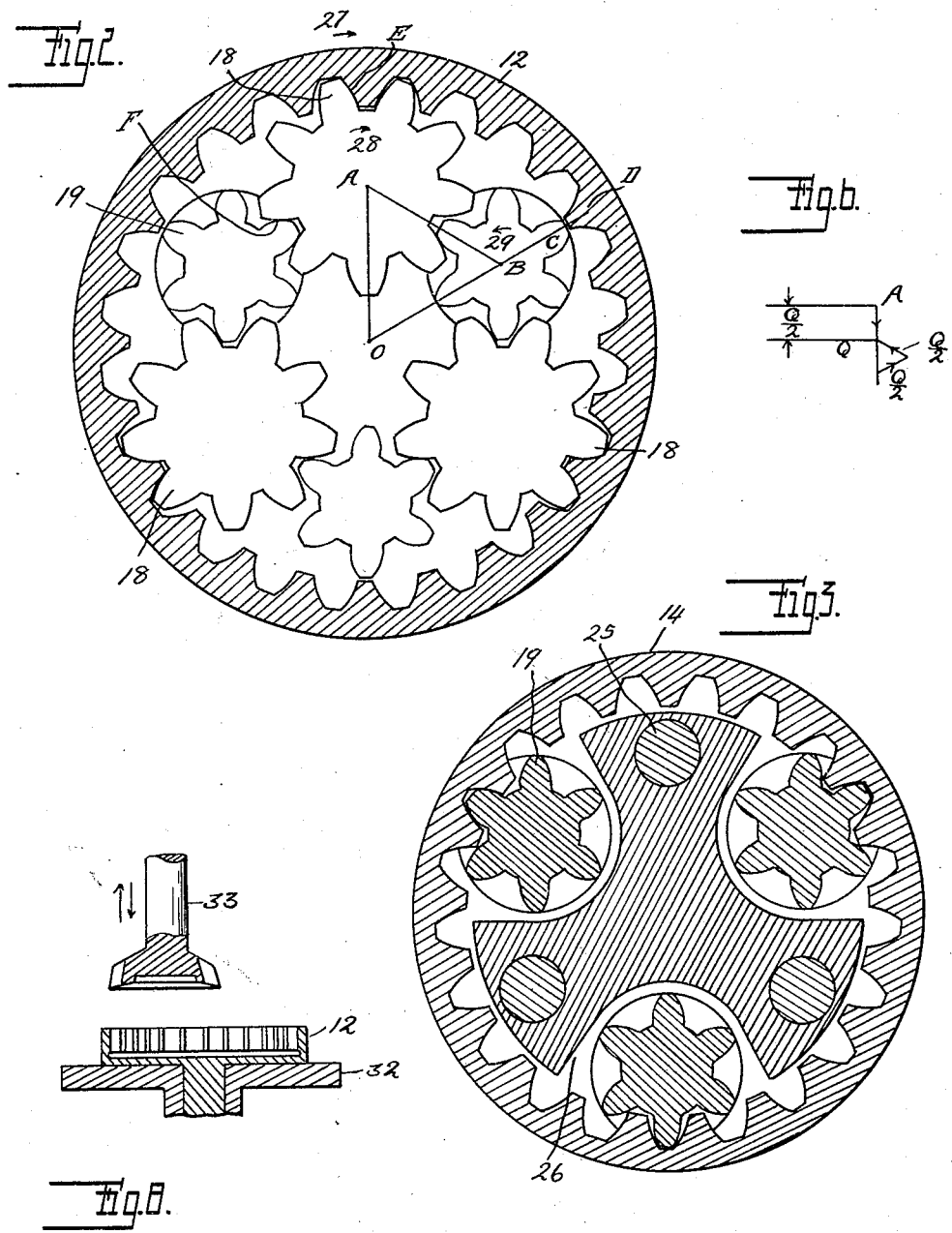

By compounding these six forces I see from Figure 5 that the three tangential forces produce a combined thrust of only $$\frac{3P}{2},$$

while the sum total of the three separating forces equals only $$\frac{Q}{2}$$

as shown in Figure 6. The latter result is rather significant because it shows that comparatively large pressure angles (giving stronger teeth) may be employed in this mechanism without unduly increasing the separating forces.

*The variable velocity modification*

If in Figure 1, I rotate the spider and hold one of the side gears fast, then the other side gear will rotate forwardly at approximately the double velocity of the spider, the exact ratios being $$1 + \frac{24}{21} \text{ and } 1 + \frac{21}{24}$$

respectively depending upon which one of the two side gears is being held immovable.

I propose now to make the above two ratios variable by superposing certain harmonic fluctuations over the constant velocity ratio with a frequency $k$ and amplitude $b$ per cycle. Such fluctuations will cause a variable velocity in the spinning wheel and will, therefore, impart a certain torque to the standing wheel due to a dynamic reaction, said torque increasing with the mass of wheel and the amplitude of fluctuations in a direct ratio and with the square of the velocity or frequency.

I conceived the idea of generating the two side gears from a pitch line harmonically undulating according to a sine curve and have constructed an apparatus whereby this can be accomplished simply, cheaply and accurately.

Figure 7:
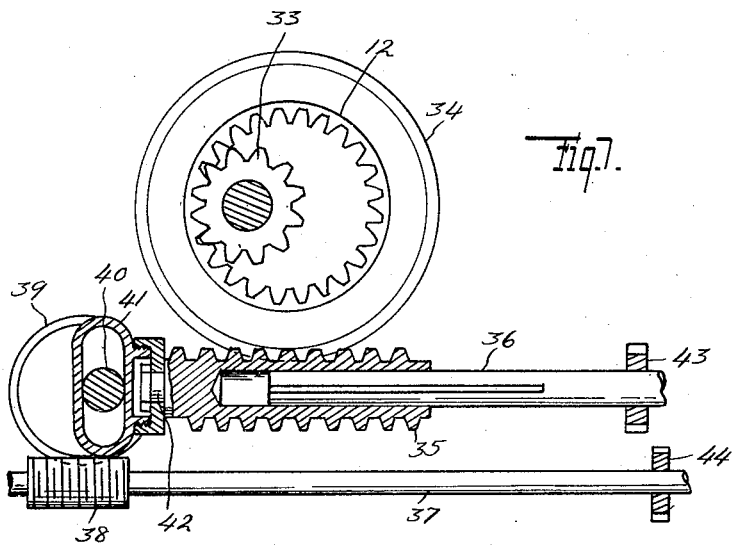
Figure 7 shows an apparatus in plan view by means of which the work table of a common gear shaper may be driven to obtain the new variable velocity tooth curves.

As shown in Figures 7 and 8, the work 12 is placed upon the table 32 of a common gear shaper, the pinion cutter 33 reciprocating up and down in the conventional manner. The novelty consists in the added mechanism shown in Figure 7 whereby the work table worm gear 34 is given a variable velocity during the process of generation by superposing a sine or some other periodic curve upon the already existing constant velocity furnished by the machine. The table worm 35 engaging the wheel 34 is rotated by the spline shaft 36 at a constant velocity and is reciprocated in a timed relation by means of the shaft 37, worm 38, wheel 39, the eccentrically mounted crank pin 40 and the crankway 41, the said crankway being rotatably mounted upon the shank 42 integral with the table worm 35. The timing is effected in any desired ratio by means of the change gears 43 and 44, while the length of the stroke is adjustable by adjusting the eccentricity of the pin 40 relative to the wheel 39.

Figure 9:
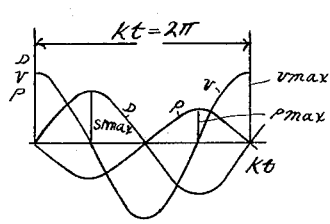
Figure 9 is a diagram explanatory of the equations 1, 2 and 3.

It is seen from the above description that the paths, velocities and accelerations caused by the oscillation of the worm 35 are all simple harmonics and their equations are derived one from another by a series of successive differentiations. Thus, let the path be denoted with $s$, velocity with $v$, acceleration with $p$, half amplitude with $b$ (the eccentricity of the pin 41 relative to the wheel 39) the frequency with $k$, the time with $t$, then I have the well known harmonic equations, see Figure 9

$$s = b \sin kt \quad (1)$$
$$v = bk \cos kt \quad (2)$$
$$p = bk^2 \sin kt \quad (3)$$

To apply these formulas for my purpose, I substitute the Equation (1) into Equation (3), and have $$p = -sk^2 \quad (4)$$

showing that the acceleration is linear with the length of stroke and increases with the square of frequency of the worm 35.

Figures 10, 11:
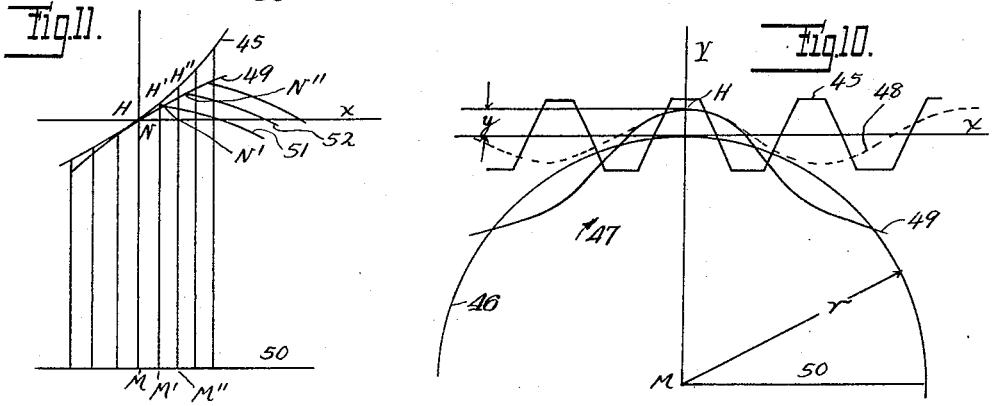
Figure 10 is explanatory of the equations 5 to 10 inclusive.
Figure 11 shows a graphic method of plotting an undulating pitch line in a gear.

I propose to show that the pitch line of the imaginary rack from which the gear 12 is generated is also a harmonic in contrast with a straight line used in the conventional rack. In Figure 10, let the rack 45 move along the axis X with a variable velocity V, the value of which is $$V = v_0 + v \quad (5)$$

where $v_0$ is the uniform velocity obtained by uniformly rotating the worm 35, Figure 7, and $v$ is the harmonic defined in the equation 2. Let the mating gear 46 rotate with a uniform angular velocity $w$ in the direction of the arrow 47. The momentary pitch point will be at H, the distance HM being the momentary pitch radius of the gear 46.

$$HM = r + y \quad (6)$$

It is now necessary that at the point H the corresponding linear velocities of the rack and mating gear be the same. Thus $$(r+y)w = v_0 + bk \cos kt \quad (7)$$

but $$v_0 = rw \quad (8)$$

and $$kt = x \quad (9)$$

from which $$y = \frac{bk}{w} \cos x \quad (10)$$

which is the equation of the undulating pitch line 48 of the rack 45. The angular velocity $w$ of the gear 46 is constant thus exactly corresponding to the conditions represented in Figure 7 in which the generating cutter 33 rotates with a uniform velocity.

The pitch line 48 of the rack 45 being undulating it follows that the corrected pitch line 49 of the mating gear 46 will also be undulating. Assume now that the rack 45 stands still and the gear 46 rolls over the said rack in such a manner that the center M of the gear always travels in the line 50, and the pitch line 49 develops itself with a pure rolling action (without sliding) upon the stationary pitch line 48. This is a familar problem in kinematics, i. e. the construction of the moving centrode (the pitch line 49) from a given fixed centrode (the pitch line 48) in plane motion. The graphical solution of this problem is shown in Figure 11. The fixed centrode 45 is subdivided into a number of small arc lengths H, H′, H″, etc., and the said dividing points H are projected upon the line 50 to form a series of points M, M′, M″, etc. In order to find the corresponding points N, N′, N″, etc., of the moving centrode 49 I scribe an arc 51 from M with the radius M′ H′, an arc 52 from the same center with the radius M″ H″ and so on, after which I space off the distances H H′ = N N′, H′ H″ = N′ N″ etc., upon the consecutive circles 51, 52, etc. The corresponding points of intersection will give the moving centrode 49.

Thus, it is now possible to graphically determine the distorted tooth curves in the gear 46 when the said gear meshes with a given variable velocity rack 45, because both pitch lines are known, and the sought tooth curves will necessarily be the envelopes of the rack 45 when the said centrodes or pitch lines 48 and 49 roll one upon the other without sliding.

The object of the above discussion is to show that first the distortion of the tooth curves is controlled by the amplitude $s$ and the frequency $k$, second that the self-locking or dynamic factor is proportional to the quantity $sk^2$ and third, that there exist graphical means by which the distortion is predeterminable in advance thus enabling me to produce gearing of the highest possible dynamic factor $sk^2$ and the least possible unfavorable distortion, i. e. with a freedom from sharp kinks, corners, undercuts and other discontinuities.

Regarding the frequency number $k$ denoting the total number of waves of the pitch line in the gears 12 and 14, it may be noted that the number should be an integer and divisible by three in order that the three pinions shown in Figures 2 and 3 may remain strictly in phase under any conditions of mounting. If the frequency $k$ be selected to equal the number of teeth in the gear, then all teeth will be equally modified and alike. However, in my process such a limitation is unnecessary, and I determine the frequency with the sole object in view as to obtain the best practical results.

The new variable velocity gears which I shall term the "sinoidal" gears for lack of a better name exhibit certain novel and heretofore unknown properties. Ordinarily, I propose to run them in pairs, one sinoidal and the other standard. However, two sinoidal gears will also mesh together providing that they are of the same pitch, pressure angle, amplitude and phase and are assembled in such a manner that the peaks of one sinoidal pitch line will fit into the bottoms of the other pitch line.

In manufacturing, I prefer to generate the new gears in a modified Fellows shaper as above explained. However, they also may be generated in other ways.

In action, the new differential (when differentiating) has a variable velocity according to a certain cycle in the side gear 12 and according to another cycle in the side gear 14, the two cycles not being in unison, as a rule. The resulting ratio thus will fluctuate according to a very irregular periodic curve, the period of which is determined by this simple calculation. The gear 12 has 24 teeth and the gear 14 has 21, the corresponding primes (after dividing each number of teeth by 3 will be 8 and 7 respectively. Thus the resultant variable velocity will have a wave length equal to $8 \times 7 = 56$ revolutions of the spinning wheel.

Figure 12:
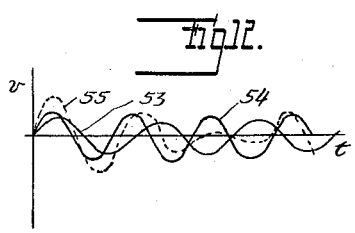
Figure 12 shows the resultant variable velocity ratio caused by the combined action of two sinoidally formed side gears.

In Figure 12 the sine curves 53 and 54, giving the individual variable ratios of the gears 12 and 14, are compounded to give the resulting long wave curve 55 above mentioned.

What I claim as my invention is:

1. In a differential, the combination of two internal side gears, one larger and one smaller one, a spider and a plurality of epicyclic pinions rotatable in the said spider and arranged in a wreath-like configuration in a circle in such a manner that the first internal gear meshes with every other pinion, in the set and the second gear meshes with the remaining pinions and in which any one pinion also meshes with two other pinions adjacent thereto, the said meshing taking place inside the larger side gear thereby shortening the over-all width of the mechanism.

2. In a differential, the combination of two internal side gears, one larger and one smaller one, a spider and a plurality of epicyclic pinions rotatable in the said spider and arranged in a wreath-like configuration in a circle in such a manner that the larger internal gear meshes with every other pinion in the set and clears with its inner diameter the outside diameters of the remaining pinions, the latter meshing with the smaller internal gear and in which any one pinion also meshes with two other pinions adjacent thereto.

3. In a differential, a series of larger pinions and a set of smaller pinions all rotatable in a spider and arranged alternately in a circular wreath in such a manner that any one pinion of the first set meshes with two pinions of the other set and each series also meshes with its corresponding internal side gear at a series of equispaced points in a circle.

4. A differential comprising a spider, two internal side gears, one larger and one smaller one, and two series of epicyclic pinions rotatable in the spider, in which the pinions of both sets alternately intermesh all around the circle inside the larger side gear and in which each side gear meshes with its corresponding series of pinions in a plurality of points equally spaced about its respective circumference.

In testimony whereof I affix my signature.

NIKOLA TRBOJEVICH.